United States Patent
Brown

(10) Patent No.: US 6,836,220 B2
(45) Date of Patent: Dec. 28, 2004

(54) MINIATURIZED SELF-CONTAINED SENSORS FOR MONITORING AND STORING DATA AS TO TEMPERATURE AND THE LIKE AT REMOTE AREAS AND REMOVABLE THEREFROM FOR DIGITAL READING, AND NOVEL METHOD OF OPERATING THE SAME

(75) Inventor: Kenneth Brown, Dracut, MA (US)

(73) Assignee: Kaye Instruments, Inc., N. Billerica, MA (US)

( * ) Notice: Subject to any disclaimer, the term of this patent is extended or adjusted under 35 U.S.C. 154(b) by 598 days.

(21) Appl. No.: 09/922,282

(22) Filed: Aug. 3, 2001

(65) Prior Publication Data

US 2003/0025613 A1 Feb. 6, 2003

(51) Int. Cl.⁷ .................................................. G08B 5/22
(52) U.S. Cl. ................................................... 340/870.37
(58) Field of Search .................. 340/870.17, 870.37; 374/170, 149, 150, 208; 702/127, 130

(56) References Cited

U.S. PATENT DOCUMENTS

| | | | | |
|---|---|---|---|---|
| 4,718,776 A | * | 1/1988 | Gilland et al. | 374/170 |
| 4,827,771 A | * | 5/1989 | Cary et al. | 73/644 |
| 5,199,297 A | * | 4/1993 | Lin et al. | 73/52 |
| 5,211,476 A | * | 5/1993 | Coudroy | 374/102 |
| 5,340,019 A | * | 8/1994 | Bohan et al. | 236/20 R |
| 5,380,091 A | * | 1/1995 | Buchanan | 374/16 |
| 5,449,234 A | * | 9/1995 | Gipp et al. | 374/185 |
| 5,814,721 A | * | 9/1998 | Mills | 73/53.01 |
| 6,310,552 B1 | * | 10/2001 | Stumberg et al. | 340/573.1 |
| 6,367,974 B1 | * | 4/2002 | Lin | 374/179 |

FOREIGN PATENT DOCUMENTS

GB            2028614      *    3/1980

* cited by examiner

Primary Examiner—Albert K. Wong
(74) Attorney, Agent, or Firm—Rines and Rines

(57) ABSTRACT

An improved data output retrieval communication method and apparatus for reading portable miniaturized temperature and related sensors by novel radio-frequency capactively coupled communication paths established at a common readout station to which the sensors are brought for such readout to a common computer or the like.

15 Claims, 2 Drawing Sheets

Communication Wells

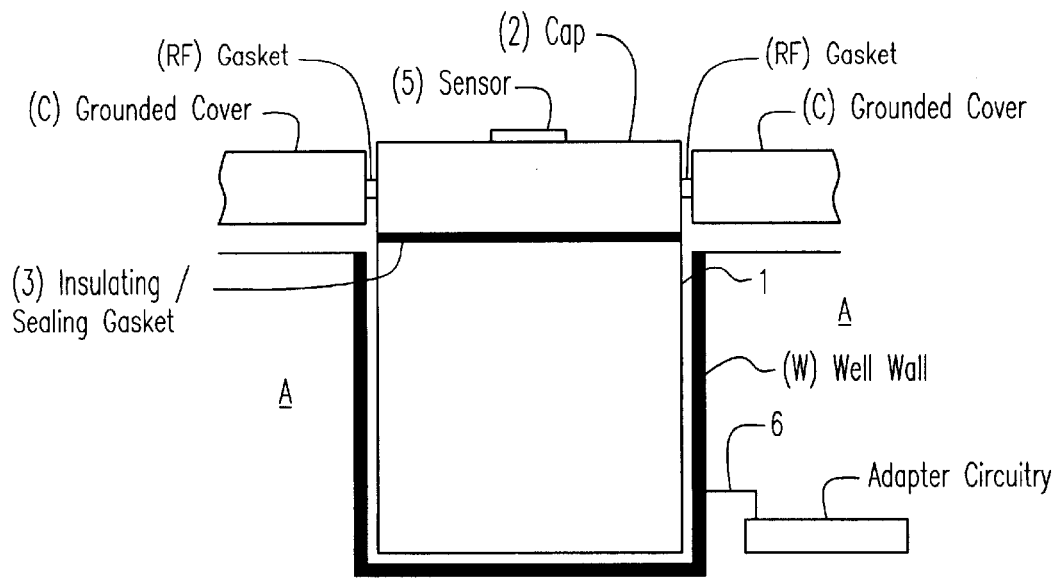
FIG. 3
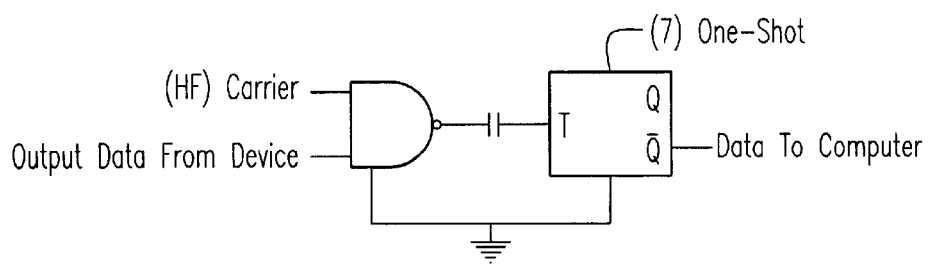
Modulated signal for code 0100100111
FIG. 4
FIG. 5

MINIATURIZED SELF-CONTAINED SENSORS FOR MONITORING AND STORING DATA AS TO TEMPERATURE AND THE LIKE AT REMOTE AREAS AND REMOVABLE THEREFROM FOR DIGITAL READING, AND NOVEL METHOD OF OPERATING THE SAME

FIELD OF INVENTION

The present invention relates to the independent probe-sensing and microprocessor programmed monitoring at remote areas of pharmaceutical and other manufacturing and processing plants and the like, of physical parameters such as temperature, humidity, and pressure, the local logging storage of such data, the facility for removal of the probes from the various monitoring areas, and the digital readout acquisitions of their logged data at a reader central computer location; being more particularly concerned with improvements that remove limitations in the miniaturized construction and battery-powered electronics of such probe monitors, and also in the efficiency and facility of the central readout acquisition of the logged data stored in the multiplicity of probes.

BACKGROUND

Such miniaturized logger/sensors have been and are currently in wide use in many industries world-wide, including particularly in the chemical and pharmaceutical processing industries and the like for temperature, humidity, pressure, rotation, and other physical parameter monitoring at various remote areas of equipment, processing containers, etc.

Among these are, for example, the "Track/Sense" monitoring and recording systems of EllabA/S of Denmark, described in their bulletin entitled "Tracksense"; the "Datatrace" of Mesa Laboratories of Colorado, stated to be constructed as described in U.S. Pat. No. 4,718,776; the "Gemini Data Loggers" of the Orion Group of the United Kingdom, Australia and the United States described at the "HOBO" and other data loggers of Onset Computers Corporation as described in their website, the "Temptale" and other portable temperature acquisition and readout system of Sensitech, Inc. as described at their website, the RL100 temperature monitors of Ryan Instruments described at their website, and much earlier, similar miniaturized remote temperature sensors and computer read-out system described by P. Christiansen in an article entitled "Temperaturverlaufe-An UnZugaanglichen Stellen Gemessin" appearing in the Sep. 19, 1986 issue of "Elektronick", Vol. 35, No. 19; in French patent 2,219,405A (Felten & Guilleaume Carlswerk); in British patent GB2028614A (AEP International Ltd.); in WO8501817A (Thermo Electric International) and in German patent DE 31396631 (Bauer Bernhard), among others.

Many of these devices have the common concepts of portable miniaturized temperature-monitoring electrically conductive sealed housings containing therein a sensor and a microprocessor for processing the sensed signal and storing the same in digital form to produce digital output signals in accordance with programmings that are transferred to an operationally independent readout console unit when the sensor is removed, and with internal battery power within the sealed container. There are several different techniques and constructions in these similar miniaturized temperature sensor housings and systems for extracting the digital output signal data from the device. The above-mentioned Ellab device, for example, uses an infra-red path through a transparent window provided in the device; and the Mesa device, as another example, uses two isolated parts of the conductive housing as a two-conductor electrical output path.

In accordance with discovery underlying the present invention, a simpler, less costly and improved type of output signal data extraction is achievable through a novel capacitive coupled technique and without resorting either to optical output communication, with its problems of window manufacture, pressure differentials, scratching, and fogging when in different environments, or to the requiring of two electrically isolated electrical housing contacts for the output, wherein the stainless steel or similar conductive housing shells do not readily lend themselves to making such contacts, and the buildup of mechanical tolerances for such construction can leave this approach unreliable, as well as expensive.

OBJECTS OF THE INVENTION

An object of the present invention, accordingly, is to provide a new and improved miniaturized sealed-housing sensor of the type and for the uses above described, having a novel output signal capacitive coupled communication path construction that admirably obviates the previously delineated drawbacks of prior art optical and two isolated housing shell contact constructions and the like.

A further object is to provide a novel method of conducting the readout of pluralities of such improved sensors, as well.

A further object is to prevent accidental charging of the internal battery by the communication circuits.

Other and further objects will be explained hereinafter and are more particularly delineated in the appended claims.

SUMMARY

In summary, however, the invention embraces, a method of outputting digital data stored in a housing sensor device comprising conductive base and cap sections sealed together by an insulating gasket and that has monitored a parameter such as temperature at a remote location and stored corresponding digital data, that comprises, removing the device from such location and inserting the same into a conductive well of cross-dimension made slightly larger than the housing and of depth substantially equal to the length of the base section, to capacitively couple the housing base section to the inner wall of the well; establishing a radio-frequency ground connection about the housing cap section protruding above the well; and communicating the data stored in the housing for external readout by installing a data outputting radio-frequency communication path through the capacitive coupling and the outer wall of the well.

Preferred and best mode designs and techniques are later detailed.

DRAWINGS

The invention will now be described in connection with the accompanying drawings, FIG. 1 of which is a pictorial isometric showing basic parts of a typical miniaturized data sensor of the type above described with the basic parts shown disassembled for cylindrical housing packaging;

FIG. 3 is a transverse section upon a larger scale showing the assembled unit of FIG. 1 inserted within a well of FIG.

2 to communicate with novel radio-frequency communication paths of the output sensed and stored data of the unit to a computer reader;

FIG. 4 is an exemplary waveform of a modulated teletype-style digital signal applied to the circuit side of the well of FIG. 3 with the addition of a high-frequency modulation during "0" code bits; and FIG. 5 is a simplified equivalent circuit of the radio-frequency communication output path used in accordance with the preferred embodiment of the invention.

PREFERRED EMBODIMENT(S) OF THE INVENTION

As earlier described, the invention is concerned with providing improved techniques and constructions for communicating out data stored in multiple, identical, small miniaturized electronic sensor monitoring systems and which are housed in closed metal housing containers, as of stainless steel to facilitate cleaning. The internal microprocessors and electronic systems are battery-powered, which requires that the container housings be capable of disassembly for battery replacement. The containers often are used in hostile, sometimes explosive environments, and may be subject to high pressures and/or high vacuums at various locations in processing plants, requiring a tight gasketed seal between the parts of the container housing which disassemble. Typically, a spherical or cylindrical shaped housing is employed to provide maximum resistance to pressure differentials with minimum weight. The electronic systems, for example, may be used to hold one or more sensors which are placed into hostile environments for monitoring, detecting, storing and recording conditions within the environment for removal and later analysis in a more benign location. The typical useage of such systems would be characterized by multiple independent sensor devices, communicating either real-time or by store-and-forward techniques with a common point at which data analysis is performed.

Electrical signal communication with the sensing systems may be required for calibration of the sensors, for the programming of some unique address code into the device, for the programming of specific parameters of a test, and for retrieving the output data stored in the sensor monitor for post-test analysis, among various purposes.

Figure 1:
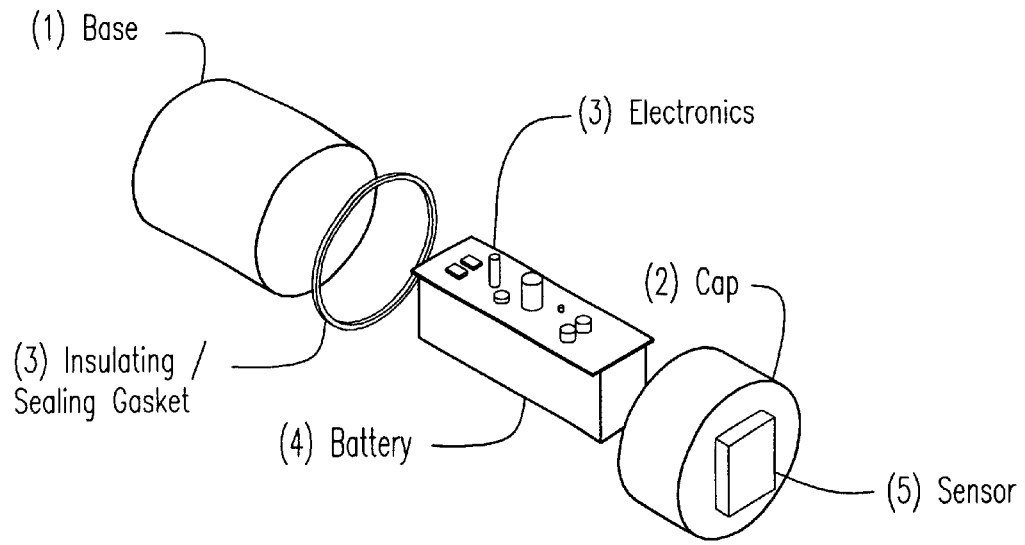

In FIG. 1, a typical device of this character, as previously described, is shown in dis-assembled form embodying a cylindrical conductive hollow housing base 1 to be assembled with a cap section 2 in sealed fashion with an intermediate gasket 3. The microprocessor, data storage and other electronics 3 and the battery 4 are shown insertable within the housing 1, and a parameter sensor 5 (temperature, for example) is shown externally mounted on the cap 2.

Figure 2:
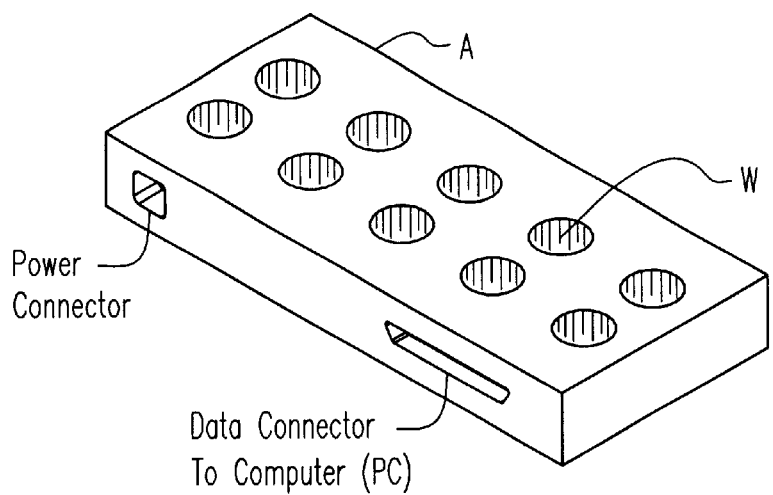
FIG. 2 is an isometric view of communication wells in which sensors removed from various remote monitoring areas are inserted to record the data accumulated during the monitoring.

As previously discussed, the digital data stored in these portable sensing monitor devices is to be outputted and read at a central computer by removing the multiple devices from their diverse monitoring locations and bringing them to a common master station for readout. It is this data outputting communication path problem that the technique of the present invention primarily addresses in obviating the limitations of the before-discussed optical window, two-conductor insulated housing section contacts, and other prior art techniques. In accordance with the invention, rather, a novel grounded communication multi-well adapter A is provided having multi wells W as shown in FIG. 2, into which the removed sensor housings are respectively inserted, FIG. 3, with a novel RF communication interconnection that permits capacitively coupled output data communication through the well to the readout computer (PC) without the disadvantages of prior output techniques.

Specifically, the gasket sealed assembled conductive housing 1-2-3, after removal from its remote location where it has stored monitoring data, is brought to and inserted within communication well unit W, FIG. 3, with capacitive coupling between the housing and the walls of the well, for enabling reading out the stored digital data in the device through a novel radio-frequency communication path provided between the housing and the well. The conductive cap section 2 sealed by the insulating gasket 3 to the base section 1 extends above the well W. The communication path, in accordance with the present invention, is established by providing a single mechanical contact to the conductive cap section or segment 2 of the two-part conductive housing 1-2 that protrudes above the well when the housing base section 1 is received therein. A ground conductive cover C provided with openings alignable with the tops of the adapter wells and having preferably resilient spring-style RF (radio-frequency) gasket material lining each opening is applied to cover the adapter A. The RF gasket circumferentially contacts the housing cap section 2 above the well, connecting the same to the grounded conductive cover C that is applied over all wells of the well adapter unit A. Such cover C thus grounds the protruding cap sections of all sensor housings inserted into the adapter wells, and no other mechanical or physical electrical contact is made with the housings. The insulating seal 3 thus lies above the well and below the cover C. The surface of the housing is kept as uniform as possible to prevent the entrapment of particulate matter and to facilitate cleaning. The cross-dimension of the well is made just slightly larger than that of the housing, and the well depth is made to correspond substantially to the length of the base section 1 of the device. In practice, a nominal clearance of about 25 mm between the well wall and the sensor housing device has been found satisfactory. The well is made as a metal cup, which is preferably anodized not only for aesthetic reasons, but also to provide an insulating layer between the inside wall of the well W and the housing 1-2 to which it is capacitively coupled. It may be appreciated, moreover, that normal use and aging of the adapter A can be expected to collect dust and other foreign matter in the well. As a housing device is inserted into the well, however, the RF spring fingers make a good contact with the cover segment 2, while the rest of the device merely rests in the well in capacitive relation thereto and with no problems even if possibly sitting on top of a layer of foreign matter.

The communication technique of the present invention applies a signal to the outer or circuit side of the well at 6, FIG. 3. This signal is preferably a typical teletype-style digital signal, with the addition of a high-frequency modulation during the "0" bits, as shown in the waveform example of FIG. 4.

A highly-simplified equivalent circuit of the communication path is shown in FIG. 5 wherein the receiving device is basically running on quiescent power, which is extremely low in a CMOS implementation. When a data pulse appears at the trigger input "T" of the one-shot 7, which is configured as a retriggerable monostable, an expanded pulse appears at the output. The time constant of the one-shot for this demodulation is chosen to be somewhat longer than the time between input pulses for a "0" bit. So long as pulses continue, the one-shot stays triggered, recovering the original input "0". When the input pulses cease, the one-shot expires, returning to a "1" state. The choice of carrier frequency is not critical: any convenient radio frequency signal in the megahertz range will admirably function. The data rate which may be supported by this technique, however, is limited by the distortion which is introduced by the demodulation process, in which a "0" bit is slightly stretched beyond the nominal width by the action of the last modulation pulse. This distortion can easily be kept well under 5% with a radio frequency carrier in the range of 10–20 MHz and a data rate in the range of 100 KHz or less. Normal teletype-style character reception, which can accept character distortion over 40%, more than suffices for proper data interpretation in the receiver.

When the above-described transmitter is not communicating with a particular sensor device, it short-circuits the well W through a low impedance to ground. This has the effect of surrounding the device with a grounded shield, preventing any crosstalk between adjacent devices. This also serves to provide a shield in unused wells, additionally preventing spurious radiation from these wells.

The physical condition of the housing, moreover, does not affect the reliability of this output data communication. The RF gasket material provides a wiping contact as the device is inserted into the well, removing any "fogging" moisture which may be present, after which a multi-finger tight contact is maintained, even if the device happens to be scratched. Dirt or foreign matter in the bottom of the well, as earlier explained, has no significant effect on the capacitance between the well and the device, and therefore cannot impact the communication.

The capacitive coupling technique of this invention further ensures that a failure in the reader electronics cannot place a constant DC voltage onto the logger shell, preventing accidental battery charging to facilitate achieving an intrinsically safe logging device.

The present invention, through its RF modulation-housing well adapter sensor output data communication technique, therefore, provides the advantages of minimizing the required mechanical contact to the device for communication, preventing signal interference between devices, providing insensitivity to scratches and "fogging" while maintaining the integrity of the housing shell to facilitate cleaning, and maintains the RF integrity of the readout adapter unit to prevent spurious emissions during output data communication from the sensor device.

Further modifications will occur to those skilled in this art and such are considered to fall within the spirit and scope of the invention as defined in the appended claims.

What is claimed is:

1. The method of outputting digital data stored in a housing sensor device comprising conductive base and cap sections sealed together by an insulating gasket and that has monitored a parameter at a remote location and stored corresponding digital data, that comprises, removing the device of such location and inserting the same into a conductive well the cross sectional dimension of which is made slightly larger than the housing and of depth substantially equal to the length of the base section, to capacitively couple the housing base section to the inner wall of the well; establishing a radio-frequency ground connection about the housing cap section protruding above the well; and communicating the data stored in the housing for external readout by means of a radio-frequency communication path through the capacitive coupling and the outer wall of the well.

2. The method of claim 1 wherein a mechanical ground connection is effected by applying a resilient radio-frequency gasket circumferentially about the protruding housing cap.

3. The method of claim 2 wherein the seal between the base and cap sections is positioned above the well and below the radio-frequency gasket.

4. The method of claim 1 wherein said radio-frequency communication path is established by applying a teletype-style digital signal with radio-frequency modulation to the outer wall of the well.

5. The method of claim 4 wherein the modulated digital signal of "1"and "0" coded bits is radio-frequency modulated during the "0" bits.

6. The method of claim 5 wherein demodulation is effected by triggering a retriggerable monostable one-shot upon the arrival of an input data pulse, and adjusting the time constant of the one-shot to be somewhat longer than the time between input pulses for a "0" bit such that, so long as pulses continue, the one-shot stays triggered, enabling recovery of the input "0"; but when the input pulses cease, the one-shot expires.

7. The method of outputting digital data stored in a plurality of housing sensor devices each comprising conductive base and cap sections sealed together by an insulating gasket and that have monitored a parameter at a plurality of different remote locations and stored corresponding digital data, that comprises, removing the devices from such locations and inserting the same into a corresponding plurality of similar conductive wells in a common well communications adapter to capacitively couple each device housing base section to the inner wall of its well; establishing radio-frequency ground connection about the housing cap section of each device protruding from its well by applying a ground cover over the adapter having a corresponding plurality of openings aligned with the wells and each lined with the resilient RF gasket for circumscribing and contacting the corresponding device cap section; and communicating the data stored in each housing for external readout by means of radio frequency communication paths through the capacitive coupling and corresponding outer wall of each well.

8. The method of claim 7 wherein the development of accidental charging in the event of a failure in the readout circuitry is prevented.

9. In miniaturized self-contained sensor devices for monitoring and storing data at remote locations and wherein each device comprises conductive base and cap sections sealed together as a housing by an insulation gasket, apparatus for enabling outputting of the stored data after removal of the devices to a common readout station, having, in combination, a common readout communication adapter having a plurality of conductive wells therein, and a ground cover for the adapter provided with a corresponding plurality of openings alignable with the wells, with each opening being aligned by a resilient RF gasket; the cross-dimension of the wells being made slightly larger than that of the housing, and the depth of the wells being made substantially corresponding to the length of the base section of the housing such that, upon insertion of each housing into its corresponding well, the cap section protrudes above the well and capacitive coupling is provided between the base section and the inner wall of the well; and, upon application of the ground cover to the adapter, the resilient RF gasket of each cover opening resiliently contacts and circumscribes the corresponding protruding cap section, thereby to ground the same; and data output connection circuitry connected to the outer wall of each well for enabling external readout of the stored data by establishing radio-frequency communication paths through the capacitive couplings in the outer walls of the wells.

10. The apparatus of claim 9 wherein said insulating gasket of each device is positioned above its well and below the cover and RF gasket when the sensor device is inserted into the adapter well and the ground cover applied thereover.

11. The apparatus of claim 10 wherein the radio-frequency communication paths are established by circuits for applying teletype-style digital signals with radio-frequency modulation to the outer walls of the wells.

12. The apparatus of claim 11 wherein the modulated signal is of digital "1" and "0" bits and the radio-frequency modulation is effected during the "0" bits.

13. The apparatus of claim 12 wherein the demodulation is effected by triggering a retriggerable monostable one-shot upon the arrival of an input data pulse, and adjusting the time constant of the one-shot to be somewhat longer than the time between input pulses for a "0" bit such that, so long as pulses continue, the one-shot stays triggered, enabling recovery of the input "0" but when the input pulses cease, the one-shot expires.

14. The apparatus of claim 9 wherein means is provided for preventing accidental battery charging in the event of a failure in the readout circuitry.

15. The apparatus of claim 14 wherein said means prevents the development of a constant DC voltage on the readout adapter.

* * * * *